May 12, 1925.
C. C. WHITTAKER
ELECTRICAL SYSTEM
Filed Dec. 17, 1919
1,537,636
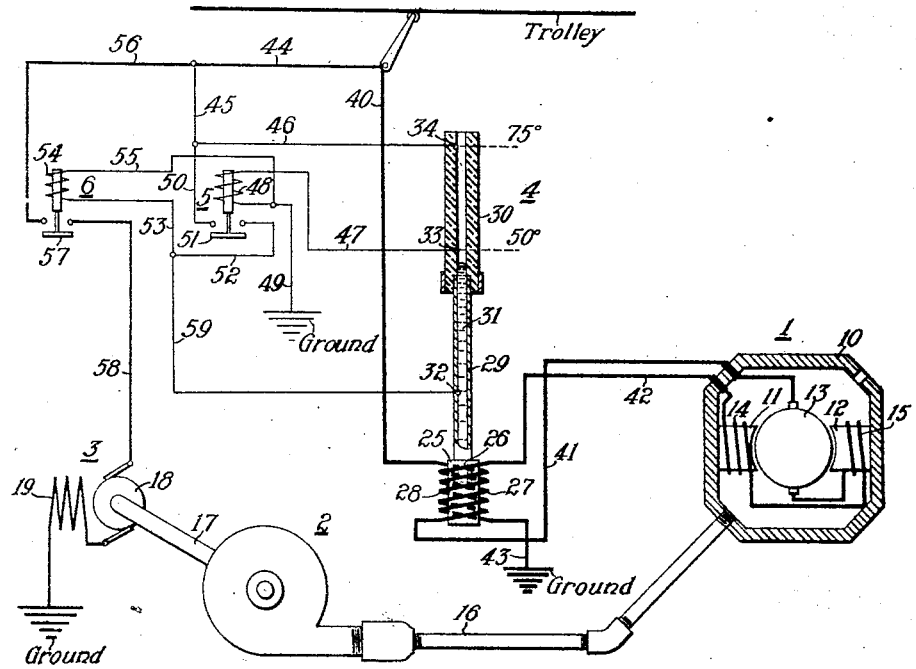
WITNESSES:
INVENTOR
Charles C. Whittaker
BY
ATTORNEY Patented May 12, 1925.

1,537,636

UNITED STATES PATENT OFFICE.

CHARLES C. WHITTAKER, OF PITTSBURGH, PENNSYLVANIA, ASSIGNOR TO WESTINGHOUSE ELECTRIC & MANUFACTURING COMPANY, A CORPORATION OF PENNSYLVANIA.

ELECTRICAL SYSTEM.

Application filed December 17, 1919. Serial No. 345,632.

*To all whom it may concern:*

Be it known that I, CHARLES C. WHITTAKER, a citizen of the United States, and a resident of Pittsburgh, in the county of Allegheny and State of Pennsylvania, have invented a new and useful Improvement in Electrical Systems, of which the following is a specification.

My invention relates to electrical systems, and it has special relation to the thermostatic control of ventilating means for electric motors or other translating devices.

The object of my invention is to provide a relatively simple and accurate means for effecting forced ventilation of an electric motor or the like only between predetermined temperature limits, thereby making for economical and, at the same time, thoroughly safe operation of the system.

More specifically stated, it is the object of my invention to provide a thermal device that is adapted to be heated at the same rate as an electric motor, together with relay means for effecting the starting and the stopping of a blower motor for ventilating the main motor at predetermined temperatures of the main motor.

My invention may best be understood by reference to the accompanying drawing, the single figure of which is a diagrammatic view of an electrical system organized in accordance with the present invention.

Referring to the drawing, the system here shown comprises supply-circuit conductors Trolley and Ground for energizing a main or car-propelling motor 1, which is intermittently ventilated by means of a centrifugal blower 2 that is driven by an auxiliary or blower motor 3, the operation of which is primarily controlled by a thermal device 4 and secondarily by a plurality of relays 5 and 6 which may be termed a holding relay and a blower switch, respectively.

The main motor 1 may be of any familiar type and is here shown in a simplified manner as comprising a frame or encasing member 10 that is provided with a plurality of radially inwardly extending polar projections 11 and 12 which enclose a commutator-type armature 13 and which are surrounded by suitable field coils 14 and 15 of the series type.

The centrifugal blower 2 may be of any well-known form and its delivery end is connected by a set of pipes or passages 16 to the motor frame 10, whereby forced ventilation of the motor may be effected under the control of the thermal device 4, as subsequently more fully described.

The blower 2 is coupled by any suitable means, such as a shaft 17, to a commutator-type armature 18 of the blower motor 3, which further comprises a series field winding 19.

The thermal device 4 is designed and adapted to be heated at the same rate as the main motor 1, which result is accomplished, generally speaking, by suitable proportioning of a metallic cylinder around which are wound coils carrying the armature and the field current of the main motor.

Specifically considered, the thermal device 4 comprises a metallic cylinder 25 having a well or recess 26 in its upper face; a plurality of coils 27 and 28, which are connected in series relation with the armature 13 and the field coils 14 and 15 of the main motor, being wound around the cylinder 25 to produce the above-mentioned similarity of thermal characteristics between the device 4 and the main motor 1.

A metallic tube 29 is inserted in the well or recess 26 in the cylinder 25, and a second tube 30 of insulating material is secured to the upper end of the metallic tube 29. A mercury column 31 is disposed in the well 26 and the tube 29, normally, that is, under low-temperature conditions, extending but a short distance within the insulating tube 30, as illustrated.

An electrical contact or junction-point 32 is made with the metallic tube 29, while a plurality of other contact points or conductors 33 and 34 are inserted in the side walls of the insulating tube 30 at calibrated heights of the mercury column respectively corresponding to 50° and 75° Fahrenheit temperature of the metallic cylinder 25 and hence of the main motor 1.

Assuming that the main motor 1 has been started into operation in any suitable manner, the circuit thereof may be traced from the Trolley through conductor 40, heating coil 27 of the thermal device 4, conductor 41, armature 13, field coils 15 and 14 of the main motor 1, conductor 42, heating coil 28 of the thermal device 4 and conductor 43 to Ground.

No further circuits are established so long as the temperature of the main motor 1 remains below the 50° mark or other limiting lower value of temperature at which it is desired to maintain the operation of the centrifugal blower 2.

The automatic operation of the ventilating system may best be explained as follows. Assuming that the high-limit temperature of 75° is attained in the main motor 1, an auxiliary circuit is established from the Trolley through conductors 44, 45 and 46, contact points 34 and 33 of the thermal device 4, which are now bridged by the mercury column 31, conductor 47, actuating coil 48 of the holding relay 5 and conductor 49 to Ground.

The closure of the holding relay 5 completes a circuit from conductor 45 through conductor 50, contact disk 51 of the holding relay, conductors 52 and 53, actuating coil 54 of the blower switch 6 and conductors 55 and 49 to Ground.

Upon the closure of the switch 6, a further circuit is established from positive conductor 44, through conductor 56, contact disk 57 of the blower switch 6, conductor 58, armature 18 and field winding 19 of the blower motor 3 to Ground. The blower motor is thus started into operation to effect a forced or artificial ventilation of the main motor 1, which is thereupon cooled, until an operating temperature slightly less than 50° is obtained, before the blower motor is de-energized.

This action is obtained irrespective of the deenergization of contact point 34 of the thermal device 4 by the shrinking mercury column, since, as soon as the holding relay 5 has closed, a holding circuit for its actuating coil 48 is formed, including positively-energized conductor 44, conductors 45 and 50, contact disk 51 of the holding relay 5, conductors 52 and 59, contact point 32, metallic cylinder 29, mercury column 31 and contact point 33 of the thermal device 4, whence circuit is completed through conductor 47, actuating coil 48 of the holding relay 5 and conductor 49 to Ground. Thus, the holding relay 5 is maintained in its upper position to likewise maintain the closure of the blower switch 6 as long as the mercury column 31 extends above the contact point 33, corresponding to a 50° temperature of the main motor.

When a temperature slightly below 50° has been attained by reason of the operation of the blower motor, the holding circuit just traced is interrupted at the contact point 33 of the thermal device 4 and, consequently, the holding relay 5 drops to its normal or open position to thereupon deenergize the actuating coil of the blower switch 6 and, therefore, stop the blower motor 3.

The above described cycle is repeated whenever temperature conditions of the main motor rise to the 75° mark. In this way, a safe maximum temperature is never exceeded in the car-propelling motor 1, but the expense of operating the blower motor is eliminated as soon as the main-motor temperature has been reduced to a predetermined lower figure. I do not wish to be restricted to the specific circuit connections, structural details or arrangements of parts herein set forth, as various modifications thereof may be made without departing from the spirit and scope of my invention. I desire, therefore, that only such limitations shall be imposed thereon as are indicated in the appended claims.

I claim as my invention:

1. The combination with a translating device, of a thermal device adapted to be heated at the same rate as said translating device, means for artificially ventilating the translating device, and means governed by the thermal device for effecting the operation of said ventilating means between predetermined temperature limits of said translating device.

2. The combination with an electric motor, of a thermal device adapted to be heated at the same rate as said motor, and means controlled by the thermal device for forcing a ventilating fluid through said motor between certain temperature limits thereof.

3. The combination with an electric motor, of a device having the same thermal characteristics as said motor, means adapted to artificially ventilate said motor, and plural relay means governed by said device for starting such artificial ventilation of said motor at a predetermined temperature and stopping such ventilation at another predetermined temperature.

4. The combination with an electric motor, of a device having the same thermal characteristics as said motor, means adapted to artificially ventilate said motor, a relay closed upon the occurrence of a predetermined temperature of said device for starting such forced ventilation of said motor and held closed until a second temperature is reached.

5. The combination with an electric motor, of a device having the same thermal characteristics as said motor, a blower communicating with said motor, a relay energized upon the occurrence of a predetermined temperature of said device for starting said blower into operation, and a holding circuit completed by the closure of said relay for preventing the opening thereof until a predetermined lower temperature is reached.

6. The combination with an electric motor, of a thermal device embodying a mercury column and an element heated at the same rate as said motor, means adapted to artificially ventilate said motor, a relay energized when the mercury column reaches a certain height to start such artificial ventilation of the motor, and a holding circuit completed by the closure of said relay for maintaining the closure thereof until the mercury column shrinks to a predetermined lesser height.

7. The combination with a main motor, of a thermal device embodying a mercury column and an element heated at the same rate as said motor, a blower motor for effecting forced ventilation of said main motor, a switch for controlling the blower motor, a relay having an actuating coil energized when the mercury column reaches a certain height to complete the energizing circuit of said switch through a contact disc of the relay, and a holding circuit also completed by said disc for maintaining the closure of said relay until the mercury column shrinks to a predetermined lesser height.

In testimony whereof, I have hereunto subscribed my name this 29th day of November, 1919.

CHARLES C. WHITTAKER.